Aug. 30, 1955 W. R. STAFFORD 2,716,677
SIGNALING SYSTEM AND CIRCUIT
Filed Dec. 6, 1952
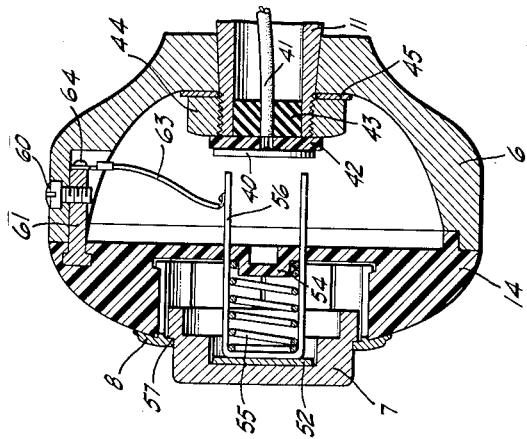
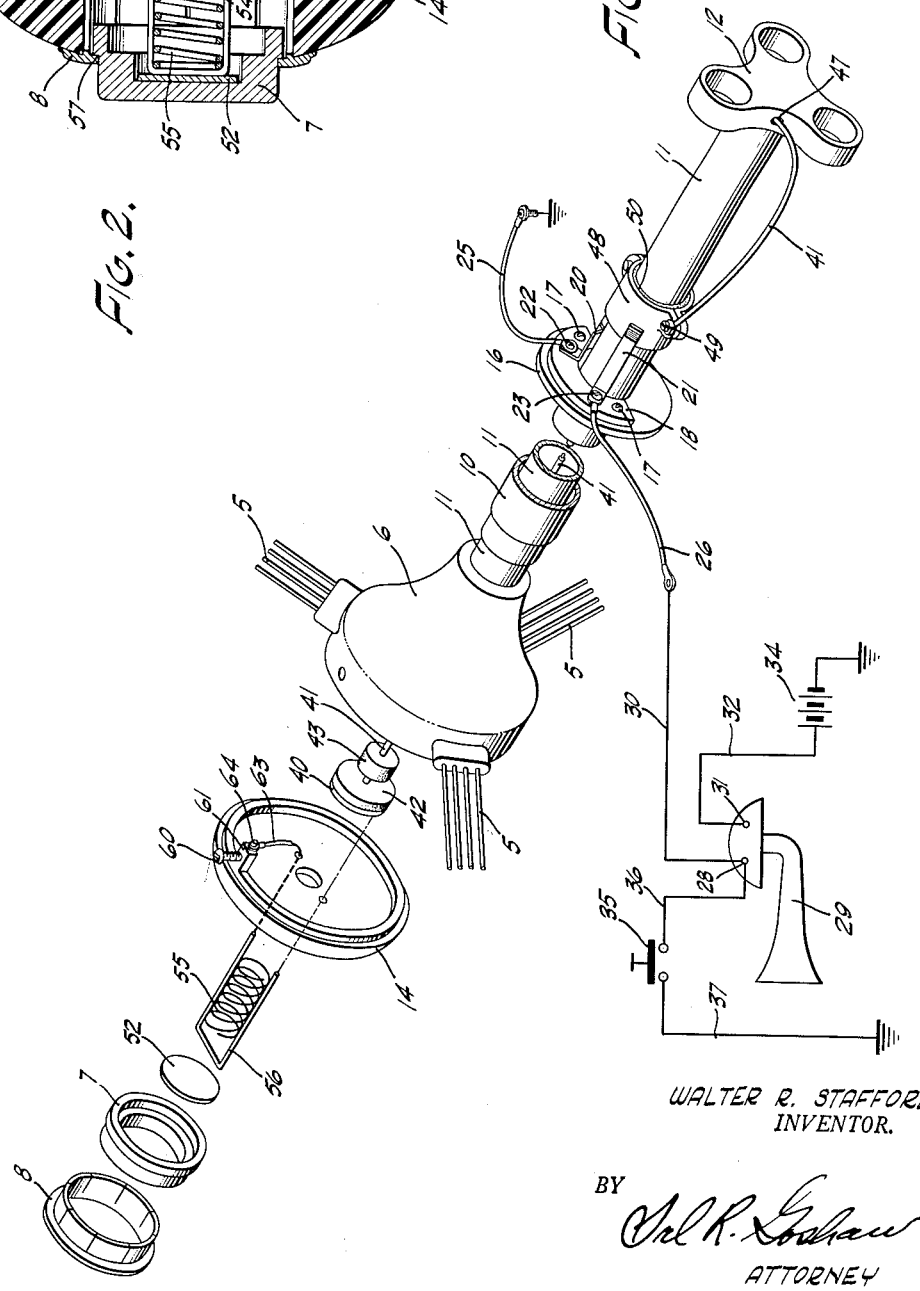
WALTER R. STAFFORD
INVENTOR.
BY
*Orl R. Godshaw*
ATTORNEY United States Patent Office 2,716,677
Patented Aug. 30, 1955

2,716,677

SIGNALING SYSTEM AND CIRCUIT

Walter R. Stafford, North Hollywood, Calif.

Application December 6, 1952, Serial No. 324,480

5 Claims. (Cl. 200—61.54)

This invention relates to signaling systems, and particularly to an electrical horn sounding system for motor cars.

As is well-known in the art, most automobile horn control buttons are on the steering wheels and usually in the form of a depressible disc or button at the center of the wheel. When the steering wheel shaft is a continuous unit and completely enclosed in a fixed column, a control wire may easily be run within the column to the end thereof, and then connected to the horn, the column being grounded to the frame to complete the horn circuit through the battery.

The present invention is directed to a horn control system and circuit for steering wheels attached to exposed rotatable shafts, which may be adjusted longitudinally or axially, the wheels having decorative centers in the form of medallions. It is particularly applicable to steering wheel structures in which no provision has been made by the manufacturer for sounding the horns from the wheel. The invention provides connections to the rotatable steering shaft by brushes on the fixed portion of the steering structure and a form of slip ring on the rotatable portion thereof. Also, a special resiliently mounted contact element is employed within the central portion of the wheel structure. The wheel control circuit is placed in parallel with any other horn control circuit from other positions provided by the manufacturer. As no current flows through the system except at the time of actual sounding of the horn, there is no fire hazard.

The principal object of the invention, therefore, is to facilitate the operation and control of an automobile horn.

Another object of the invention is to provide an improved automobile horn control system and circuit.

A further object of the invention is to provide an improved horn control system and circuit for automobile steering wheels having exposed rotatable shafts which are adjustable.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an exploded perspective view of an automobile horn control system and circuit embodying the invention, and Fig. 2 is a cross-sectional view of the steering wheel control button structure of the invention.

Referring now to the drawings, in which the same numerals identify like elements, the rotatable portion of the steering structure includes a wheel, not shown, supported on wire spokes 5, a central wheel hub or cup 6, a medallion 7, supporting ring 8, shaft 11, and universal joint 12, and a cover or cap 14. The fixed portion of the steering structure is a circular plate 16, which is attached to the body on the engine compartment side of the motor car, and a column 10 attached thereto. The shaft 11 may be splined to permit axial adjustment, or longitudinal adjustment, of the wheel position.

Attached to plate 16 by screws 17, is an insulating segment 18, to which is attached two brushes 20 and 21 by screws 22 and 23, respectively. The brushes are of conducting material and biased resiliently toward the axis of the steering shaft 11. A wire conductor 25 has one end connected to brush 20 and the other end connected to a body bolt or fender brace, whichever is more convenient. A wire conductor 26 has one end connected to brush 21 and its other end connected to terminal 28 of an electrical horn 29, as indicated by line 30. The other terminal 31 of horn 29 is connected by conductor 32 to battery 34, which has its other terminal grounded to the frame of the car, and thus, to brush 20. The horn may be energized and sounded by the closing of a dash switch 35 over conductors 36 and 37, which may be the normal horn sounding circuit supplied by the manufacturer. The shaft 11 under brush 20 is cleaned to permit good contact between the shaft and brush.

Referring now to the wheel portion of the system, a brass plate 40 has a wire conductor 41 soldered thereto, this plate being insulated by a fiber washer 42. A rubber gromet 43 frictionally holds wire 41, washer 42, and plate 40 in position within the end of shaft 11. This permits longitudinal adjustment of shaft 11, while maintaining plate 40 in a fixed position with respect to the element adapted to contact plate 40. The end of shaft 11 is tapered and attached to cup 6 by a nut 44 threaded thereon. A lock washer 45 is positioned between the nut 44 and cup 6. The conductor 41 continues down the shaft 11, exits from a hole 47 in universal joint 12, and is attached to a two-section collar 48 by a screw 49. The collar 48 is insulated from shaft 11 by a fiber ring 50, but turns with shaft 11. The collar under brush 21 is cleaned to permit good contact between the brush and the collar.

Mounted in an opening at the center of cap 14 is ring 8, within which is medallion 7, provided with a brass pressure disc 52. Mounted on a boss 54 of cap 14, is a coil spring 55, which bears against the inner side of the square end of a metal U-shaped pin 56, the spring urging the pin and medallion 7 outwardly, the medallion being held by the flange 57 of ring 8. Pressure on the medallion brings the ends of pin 56 in contact with disc 40 when the horn 29 is to be sounded.

The cap 14 is of plastic and is attached to cup 6 by a screw 60 passing through the rim of metallic cup 6 and through a metal lug 61 pressed into cap 14. To electrically connect U pin 56 to cup 6, a wire conductor 63 has one end soldered to the pin and the other end attached by screw 64 to lug 61, which is held by screw 60 in cup 6. Thus, the pin 56 is grounded through the shaft 11, brush 20, and conductor 25.

To energize the horn 29, therefore, the medallion 7 is pressed to make contact between the pin 56 and disc 40. This forms a circuit from grounded conductor 25, brush 20, shaft 11, cup 6, conductor 63, pin 56, disc 40, conductor 41, collar 48, brush 21, conductor 26, horn 29, and battery 34 to ground. There is thus provided a horn control system for a steering assembly structure with an exposed steering shaft which has the horn control button on the steering wheel. This control circuit is in parallel with the control circuit of switch 35, and thus, does not interfere therewith. Since no current flows through the circuit except when contact is made between pin 56 and plate 40, the hazard of fire is reduced to a minimum.

I claim:

1. In a steering column switch assembly for energizing a horn from a battery, the combination of an exposed rotatable steering shaft, a pair of fixedly positioned brushes around said shaft, one of said brushes contacting said shaft, a rotatable collar on said shaft insulated from said shaft, said other brush contacting said collar, a conducting plate at one end of said shaft and insulated therefrom, a conductor from said collar to said plate, a depressible conductor electrically connected to said rotatable shaft, and means for moving said depressible conductor in contact with said conducting plate.

2. A steering column switch assembly in accordance with claim 1, in which said last mentioned means includes a depressible button mounted on said depressible conductor for moving said conductor into contact with said plate.

3. A steering column switch assembly in accordance with claim 2, in which a spring is provided for urging said depressible conductor out of contact with said plate.

4. In a steering column switch assembly for an automobile having an exposed rotatable shaft for the steering wheel, the combination of a rotatable shaft rotatable by said wheel, means in slidable contact with said rotatable shaft, a pair of contact members, one of said members being a depressible conductor at the end of said shaft and axially movable within said wheel, and the other of said contact members being a conducting disc mounted on one end of and insulated from said shaft within said wheel, means for depressing said movable contact member into contact with said disc, a collar around and insulated from said shaft, and means in slidable contact with said collar, said slidable contact means being a pair of fixedly positioned resilient brushes, one of said brushes being in contact with said shaft and the other of said brushes being in contact with said collar.

5. In a steering column switch assembly for an automobile having an exposed rotatable shaft for the steering wheel, the combination of a rotatable shaft rotatable by said wheel, means in slidable contact with said rotatable shaft, a pair of contact members, one of said members being a depressible conductor at the end of said shaft and axially movable within said wheel, and the other of said contact members being a conducting disc mounted on one end of and insulated from said shaft within said wheel, means for depressing said movable contact member into contact with said disc, a collar around and insulated from said shaft, means in slidable contact with said collar, a frictional gromet being provided for holding said disc in position in said shaft during axial movement of said shaft.

References Cited in the file of this patent

UNITED STATES PATENTS

| | | |
|---|---|---|
| 1,686,600 | Cragg | Oct. 9, 1928 |
| 1,718,643 | Geistert | June 25, 1929 |
| 1,801,551 | Geyer | Apr. 21, 1931 |
| 1,835,780 | Jacobi | Dec. 8, 1931 |
| 1,926,335 | Hawley | Sept. 12, 1933 |
| 1,998,719 | Hillmer | Apr. 23, 1935 |
| 2,257,706 | Sladky | Sept. 30, 1941 |